United States Patent [19]
Serini et al.

[11] Patent Number: 5,010,162
[45] Date of Patent: Apr. 23, 1991

[54] POLYCARBONATE OF ALKYL CYCLOHEXYLIDENE BISPHENOL

[75] Inventors: Volker Serini; Dieter Freitag, both of Krefeld; Uwe Westeppe, Mettmann; Karsten Idel, Krefeld; Ulrich Grigo, Kempen; Carl Casser, Cologne; Klaus-Christian Paetz, Burscheid; Manfred Hajek, Leverkusen, all of Fed. Rep. of Germany

[73] Assignee: Bayer Aktiengesellschaft, Leverkusen, Fed. Rep. of Germany

[21] Appl. No.: 452,874

[22] Filed: Dec. 19, 1989

[30] Foreign Application Priority Data

Dec. 23, 1988 [DE] Fed. Rep. of Germany ....... 3843560
Aug. 12, 1989 [DE] Fed. Rep. of Germany ....... 3926719

[51] Int. Cl.⁵ .............................................. C08G 64/06
[52] U.S. Cl. .................................... 528/196; 524/611; 528/204
[58] Field of Search ............................. 528/196, 204

[56] References Cited

FOREIGN PATENT DOCUMENTS 61-62039 3/1986 Japan .
61-62040 3/1986 Japan .
61-105550 5/1986 Japan .

*Primary Examiner*—Harold D. Anderson
*Attorney, Agent, or Firm*—Joseph C. Gil; Aron Preis

[57] ABSTRACT

Thermoplastic aromatic polycarbonates having average molecular weights $\overline{M}w$ of at least 10,000 which contain bifunctional carbonate structural units corresponding to formula (I)

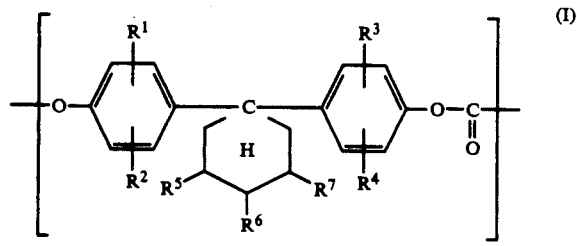

in which $R^1$, $R^2$, $R^3$ and $R^4$ independently of one another represent hydrogen, a $C_1$-$C_{12}$ hydrocarbon radical, halogen and $R^5$, $R^6$ and $R^7$ represent hydrogen, iso-$C_3$-$C_5$-alkyl, one of the substituents $R^5$, $R^6$ or $R^7$ not being hydrogen, in quantities of from 100 to 1 mol-%, based on the total quantity of difunctional carbonate structural units in the polycarbonate.

3 Claims, No Drawings

POLYCARBONATE OF ALKYL CYCLOHEXYLIDENE BISPHENOL

This invention relates to thermoplastic aromatic polycarbonates having average molecular weights Mw of at least 10,000, preferably in the range from 10,000 to 250,000 especially 10,000 to 120,000 and, more preferably, in the range from 15,000 to 80,000 especially 20,000 to 60,000, which contain bifunctional carbonate structural units corresponding to formula (I)

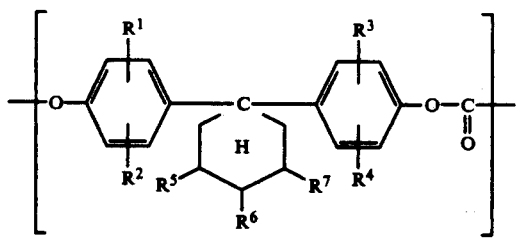
(I)

in which
  $R^1$, $R^2$, $R^3$ and $R^4$ independently of one another represent hydrogen, a $C_1$–$C_{12}$ hydrocarbon radical, halogen and
  $R^5$, $R^6$ and $R^7$ represent hydrogen, iso-$C_3$–$C_5$-alkyl, one of the substituents $R^5$, $R^6$ or $R^7$ not being hydrogen, in quantities of from 100 to 1 mol-%, preferably in quantities of from 100 to 5 mol-% and, more preferably, in quantities of from 100 to 20 mol-%, based on the total quantity of difunctional carbonate structural units in the polycarbonate.

Japanese Patent Nos. 61 062 039, 61 062 040 and 61 105 550 describe polycarbonates consisting completely or partly of structural units corresponding to formula (IA)

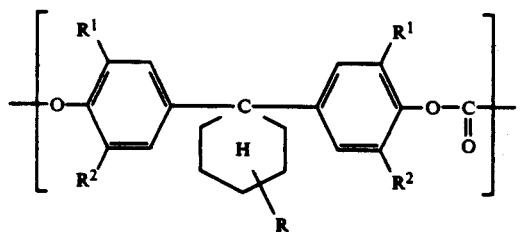
(IA)

in which
  $R^1$ and $R^2$ are hydrogen, halogen or methyl and
  R is hydrogen, halogen, OH, COOH, acetyl or $C_1$–$C_4$ alkyl ($C_1$–$C_5$ alkyl in JP 61 062 040).

Polycarbonates consisting completely or partly of units corresponding to formula (IA), in which $R^1$, $R^2$ and R are hydrogen, are used in the Examples of these patent specifications. These patent specifications do not contain any hint indicating that corresponding polycarbonates, in which R is $C_1$–$C_5$ alkyl instead of hydrogen, might have better properties. Instead, there is reason to believe that the unsubstituted cyclohexylidene ring in the polycarbonate structural unit (IA) was regarded as the best mode in these patent specifications as only such polycarbonates are contained in the working Examples.

It has now been found that the polycarbonates according to the invention have suprisingly high glass transition temperatures Ta, even when containing only such amounts of structural units of formula (I). They also have an especially advantageous mould release behavior, expceptional melt flow taking into account their high glass transition temperature Tg. They are additionally tracking resistant, stable to hydrolysis and ageing resistant.

The carbonate structural units corresponding to formula (I) are based on bisphenols corresponding to formula (II)

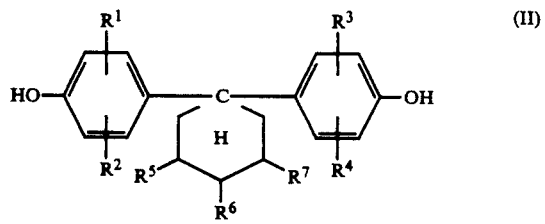
(II)

in which
  $R^1$, $R^2$, $R^3$, $R^4$, $R^5$ and $R^7$ have the same meaning as in formula (I).

In formulae (I) and (II), $R^1$, $R^2$, $R^3$ and $R^4$ are preferably hydrogen, methyl, ethyl, phenyl, cyclohexyl, chlorine and bromine and, more preferably, hydrogen, methyl and bromine.

If more than one of the substituents $R^1$, $R^2$, $R^3$ and $R^4$ is not hydrogen, identical substituents are preferred. If two of the substituents $R^1$, $R^2$, $R^3$ and $R^4$ are not hydrogen, o,o'-substitution, with reference to the carbonate groups (formula (I)) or to the phenolic OH groups (formula (II)), is preferred. If none of the four substituents $R^1$, $R^2$, $R^3$ and $R^4$ is hydrogen, the o,o,o',o'-substitution, (reference as before), is preferred.

In formulae (I) and (II), $R^5$, $R^6$ and $R^7$ are hydrogen and iso-$C_3$–$C_5$-alkyl such as isopropyl, tert.-butyl, 1-methylpropyl, 1,1-dimethylpropyl, 1-methylbutyl, 1,2-dimethylpropyl and 2,2-dimethylpropyl, preferably isopropyl, tert.-butyl, 1-methylpropyl and 1,1-dimethylpropyl; more preferably tert.-butyl and 1,1-dimethylpropyl and, most preferably, tert.-butyl.

Any iso-$C_3$–$C_5$-alkyl substituent in formulae (I) and (II) is preferably in the 4-position in the cyclohexylidene ring ($R_5$ and $R_7$=H; $R_6$=iso-$C_3$–$C_5$-alkyl), when availability of the starting material is of primary concern and in the 3-position when exceptional heat stability of the polycarbonate is required.

The following are examples of bisphenols corresponding to formula (II):
1,1-bis-(4-hydroxyphenyl)-4-isopropyl-cyclohexane
1,1-bis-(4-hydroxyphenyl)-4-tert.-butyl-cyclohexane
1,1-bis-(4-hydroxyphenyl)-4-(1-methylpropyl)-cyclohexane
1,1-bis-(4-hydroxyphenyl)-4-(1,1-dimethylpropyl)-cyclohexane
1,1-bis-(4-hydroxyphenyl)-3-isopropyl-cyclohexane
1,1-bis-(4-hydroxyphenyl)-3-tert.-butyl-cyclohexane
1,1-bis-(4-hydroxyphenyl)-3-(1-methylpropyl)-cyclohexane
1,1-bis-(4-hydroxyphenyl)-3-(1,1-dimethylpropan)-cyclohexane
1,1-bis-(3-methyl-4-hydroxyphenyl)-4-tert.-butyl-cyclohexane
1,1-bis-(3-methyl-4-hydroxyphenyl)-4-(1,1-dimethylpropyl)-cyclohexane
1,1-bis-(3-chlor-4-hydroxyphenyl)-4-tert.-butyl-cyclohexane 1,1-bis-(3,5-dimethyl-4-hydroxyphenyl)-4-tert.-butyl-cyclohexane
1,1-bis-(3,5-dimethyl-4-hydroxyphenyl)-4-(1,1-dimethylpropyl)-cyclohexane
1,1-bis-(3,5-dimethyl-4-hydroxyphenyl)-3-isopropyl-cyclohexane
1,1-bis-(3,5-dimethyl-4-hydroxyphenyl)-3-tert.-butyl-cyclohexane
1,1-bis-(3,5-dichlor-4-hydroxyphenyl)-4-tert.-butyl-cyclohexane
1,1-bis-(3,5-dichlor-4-hydroxyphenyl)-4-(1,1-dimethylpropyl)-cyclohexane
1,1-bis-(3,5-dichlor-4-hydroxyphenyl)-4-isopropyl-cyclohexane
1,1-bis-(3,5-dichlor-4-hydroxyphenyl)-4-(1-methylpropyl)-cyclohexane Bisphenols corresponding to formula (II) are known or may be obtained by known methods from corresponding ketones and phenols.

In addition to the carbonate structural units corresponding to formula (I), the polycarbonates according to the invention contain quantities—complementary to 100 mol-%—of other difunctional carbonate structural units, for example those corresponding to formula (III) below which are based on bisphenols corresponding to formula (IV):

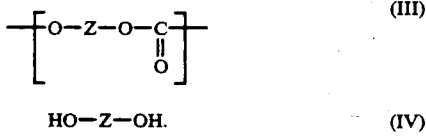

Bisphenols corresponding to formula (IV) are those in which Z is a $C_{6-30}$ aromatic radical which may contain one or more aromatic nuclei, may be substituted and may contain aliphatic radicals or other cycloaliphatic radicals than those corresponding to formula (II) or heteroatoms as bridge members.

Examples of diphenols corresponding to formula (IV) are hydroquinone, resorcinol, dihyroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)sulfoxides, α,α'-bis-(hydroxyphenyl)-diisopropylbenzenes and nucleus-alkylated and nucleus-halogenated compounds thereof.

These and other suitable diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 956; in FR-PS 1 561 518 and the book by H. Schnell entitled "Chemistry and Physics of Polycarbonates", Interscience Publishers, New York 1964.

Preferred other diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols corresponding to formula (IV) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane is particularly preferred.

The other diphenols may be used both individually and also in admixture.

Small quantities (from 0.05 to 2.0 mol-%, based on diphenols used) of trifunctional or more than trifunctional compounds, particularly those containing three or more than three phenolic hydroxyl groups, may optionally be used in known manner as branching agents to obtain branched polycarbonates. Some of the compounds containing three or more than three phenolic hydroxyl groups which may be used for branching are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-o-terephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds are used in known manner in typical concentrations as chain terminators for regulating molecular weight. Suitable compounds are, for example, secondary amines, phenols and acid chlorides. It is preferred to use phenols, for example tert.-butylphenols, or other alkyl-substituted phenols. Small quantities of phenols corresponding to formula (V)

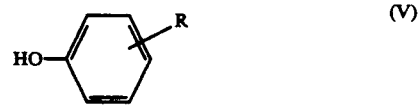

in which R is a branched $C_8$ and/or $C_9$ alkyl radical, are particularly suitable for regulating molecular weight. The percentage of $CH_3$ protons in the alkyl radical R is preferably from 47 to 89% and the percentage of CH and $CH_2$ protons from 53 to 11%. In addition, R is preferably in the o- and/or p-position to the OH group and the upper limit to the ortho component is, more preferably, 20%.

Some particularly suitable phenols are phenol, p-tert.-butylphenol, hydroxydiphenyl, p-cumylphenol and, in particular, p-3,5-dimethylheptylphenol and m- and p-1,1,3,3-tetramethylbutylphenol. The chain terminators are generally used in quantities of from 0.1 to 10 mol-% and preferably in quantities of from 0.5 to 8 mol-%, based on diphenols used.

The polycarbonates according to the invention may advantageously be produced in known manner by the phase interface polycondensation process (cf. H. Schnell, "Chemistry and Physics of Polycarbonates", Polymer Reviews, Vol. IX, pages 33 et seq., Interscience Publishers, 1964).

In this process, the diphenols corresponding to formula (II) are dissolved in aqueous alkaline phase. To prepare copolycarbonates with other diphenols, mixtures of diphenols corresponding to formula (II) and the other diphenols, for example those corresponding to formula (IV), are used. Chain terminators, for example corresponding to formula (V), may be added to regulate molecular weight. The reaction with phosgene is then carried out by the interfacial condensation method in the presence of an inert organic phase which preferably dissolves polycarbonate. The reaction temperature is generally in the range from 0° C. to 40° C.

The 0.05 to 2 mol-% of branching agents to be optionally used may either be initially introduced with the diphenols in the aqueous alkaline phase or may be added in solution in the organic solvent before the phosgenation.

In addition to the diphenols of formula (II) to be used and the other diphenols corresponding to formula (IV), it is also possible to use mono-and/or bis-chlorocarbonic acid esters thereof, which are added in solution in organic solvents. The quantity of chain terminators and of branching agents is then determined by the mols of diphenolate structural units corresponding to formula (II) and, optionally, of the other diphenolate structural units, such as for example those corresponding to formula (IV). Similarly, where chlorocarbonic acid esters are used, the quantity of phosgene may be reduced accordingly in known manner.

Chlorinated hydrocarbons for example, such as chloroform, dichloroethane, di-and tetrachloroethylene, tetrachloroethane, methylene chloride, chlorobenzene and dichlorobenzene, and also non-chlorinated hydrocarbons, such as for example toluene and xylene, and mixtures of these solvents, particularly mixtures of methylene chloride and chlorobenzene, may be used as the organic phase for the interfacial polycondensation and as organic solvent for the solution of the chain terminators and, optionally, for the branching agents and the chlorocarbonic acid esters. The chain terminators and branching agents used may optionally be dissolved in the same solvent.

The organic phase used for the phase interface polycondensation may be, for example, methylene chloride, chlorobenzene or toluene and also mixtures of methylene chloride and chlorobenzene.

Aqueous NaOH solution or KOH solution for example is used as the aqueous alkaline phase.

The production of the polycarbonates according to the invention by the phase interface polycondensation process may be catalyzed in known manner by such catalysts as tertiary amines and phase transfer catalysts, particularly tertiary aliphatic amines such as, for example, tributylamine, triethylamine, N-ethyl piperidine and, in particular, quaternary ammonium and phosphonium compounds and crown ethers, such as for example tetrabutyl ammonium bromide and triphenyl benzyl phosphonium bromide. The catalysts are generally used in quantities of from 0.05 to 30 mol-%, based on the mols of diphenols used. The catalysts are generally added before the beginning of phosgenation or during or even after phosgenation.

The polycarbonates according to the invention are isolated in known manner, for example by separating off the organic phase containing the dissolved polycarbonate obtained in the phase interface polycondensation, washing until neutral and free from electrolyte and then isolating the polycarbonate in the form of a granulate, for example in an evaporation extruder, or in the form of a powder or pellets by precipitation using a non-solvent and subsequent drying or by spray evaporation.

The high molecular weight, thermoplastic aromatic polycarbonates according to the invention may also be prepared by the known homogeneous-phase process, the so-called "pyridine process", and by the known melt transesterification process, for example using diphenylcarbonate instead of phosgene. In these cases, too, the polycarbonates according to the invention are isolated in known manner.

The additives normally used for thermoplastic polycarbonates, such as stabilizers, mold release agents, pigments, flameproofing agents, antistatic agents, fillers and reinforcing materials, may be added to the polycarbonates according to the invention in the usual quantities before or after their processing.

As flameproofing additives there can be used:

1. Alkali, alkaline earth and ammonium salts of aliphatic and aromatic sulfonic acids, carboxylic acids and phosphonic acids. These can be substituted in different ways, for instance, by F, Cl, Br, alkyl. Salt type flameproofing agents of this kind can also be oligomeric or polymeric. Salt type flameproofing additives are inter alia described in the following patent applications: DE-OS 1 694 640, 1 930 257, 2 049 358, 2 212 987, 2 149 311, 2 253 072, 2 703 710, 2 458 527, 2 458 968, 2 460 786, 2 460 787, 2 460 788, 2 460 935, 2 460 937, 2 460 944, 2 460 945, 2 460 946, 2 461 063, 2 461 077, 2 461 144, 2 461 145, 2 461 146, 2 644 114, 2 645 415, 2 646 120, 2 647 271, 2 648 128, 2 648 131, 2 653 327, 2 744 015, 2 744 016, 2 744 016, 2 744 017, 2 744 018, 2 745 592, 2 948 871, 2 948 439, 3 002 122.

2. Organic halogen compounds optionally combined with synergists, for instance, halogenated aromatic compounds. Such flameproofing agents are described inter alia in the following patent applications: DE-OS 2 631 756, JA 51-119 059, DE-OS 3 342 636, EP-A 31 959, DE-OS 3 010 375, 2 631 756.

3. Halogenated phthalimides or phthalimide sulfonates: DE-OS 2 703 710, 3 203 905, 3 322 057, 3 337 857, 3 023 818.

4. Salts of halogenated complexed acids such as cryolite, salts of tetrafluoroboric acid and of fluorosalicic acid described inter alia in DE-OS 2 149 311 and 3 023 818.

5. Partly or totally fluorinated polyolefines described, for instance, in DE-OS 2 535 262, 2 915 563, 2 948 439, 3 023 818.

6. Sulfonamides, disulfonamides and salts thereof: EP-A 71 125, 14 322, WO 86/4911.

7. Elementary sulfur or red phosphorous: DE-OS 2 345 508, 2 355 211.

8. Ferrocene or its derivatives: DE-OS 2 644 437.

9. Diphenylsulfone: DE-OS 2 129 204.

10. Nickel salts: DE-OS 1 918 216.

11. Polyphenylenesulfide: DE-OS 2 503 336, EP-A 87 038.

12. Alkali and alkaline earth as well as zinc salts of hydrochloric acid, sulfuric acid, phosphoric acid, nitric acid, hydrogen sulfide, boric acid as well as acetic salts of these acids: WO 87/542, U.S. Pat. No. 4,408,005, EP-A 174 864.

13. Siloxanes: DE-OS 2 535 261.

As comonomers which are useful for flameproofing there are described:

1. Chlorinated and brominated bisphenol A and 4,4'-dihydroxydiphenyl sulfide: EP-A 31 958, 61 060.
2. Siloxane blocks: DE-OS 3 334 782.
3. Dihydroxydiphenyl sulfone: U.S. Pat. No. 3,912,688.
4. Sulfo anilide end groups: EP-A 82 483.

Flameproofing methods can be applied individually or combined.

Flameproofing additives are incorporated into the polycarbonates which contain diphenols of formula (I) in polymerized form preferably in extruders or kneaders individually or combined. In many cases the flameproofing additives can be added to the polycarbonates during the manufacture or even to the starting materials. It is also possible to add flameproofing additives to solutions of the polycarbonates with subsequent removal of the solvent. The amounts of flameproofing additives are preferably 0.001 to 50% by weight in case of monomers preferably 0.1 to 50 mol-%.

More specifically for example graphite, carbon black, metal fibres, metal powder, silica, quartz, talcum, mica, caoline, clays, $CaF_2$, $CaCO_3$, aluminum oxide, glass fibres, carbon fibres, ceramic fibres, organic and inorganic pigments can be added and as mould release agent, for instance, glyceral stearate, pentaerythrite tetrastearate and trimethylolpropane tristearate.

The polycarbonates according to the invention can be processed according to known methods of thermoplastic shaping to yield shaped articles. This can be done, for instance, by extruding the recovered polycarbonates to a granulate and fabricating the granulates optionally after adding the above-identified agents, for instance, by injection moulding, extrusion, blowing, rotation, casting or hot pressing. Shaped articles manufactured in this way include fibres, plates and sheets. Sheets can be for the processed by deep drawing. Also films can be manufactured and can be combined with other films. The polycarbonates of the invention can also be used in combination materials such as combined with fibres and other polymers.

Shaped articles of polycarbonates according to the invention can be used, for instance, in electrical appliances or in construction with particular advantage when complicated parts required dimensional stability under heat are to be produced.

Moulded articles include fibres, plates and films. Films can also be shaped by deep-drawing. Films can be fabricated into composite films. The polycarbonates can also be used in combination with other materials such as fibres and other plastics.

EXAMPLE 1

Polycarbonate of 1,1-bis-(4-hydroxyphenyl)-4-tert.-butyl-cyclohexane 324 g (1 mol) 1,1-bis-(4-hydroxyphenyl)-4-tert.-butyl-cyclohexane were dissolved in 3 l water. 3 l methylene chloride with 6.8 g (0.033 mol) 4-(1,1,3,3-tetramethylbutyl)-phenol dissolved therein were added to the resulting solution. 148.5 g (1.5 mol) phosgene were then introduced into the mixture over a period of 30 minutes with intensive stirring at 25° C. After the addition of 1.13 g (0.01 mol) N-ethyl piperidine, the mixture was intensively stirred for 60 minutes at 25° C. The bisphenolate-free aqueous phase was separated off. After acidification with dilute phosphoric acid, the organic phase was washed with water until free from electrolyte and concentrated by evaporation. The polycarbonate obtained was then freed from the remaining methylene chloride by drying. It was colorless and showed a relative viscosity $\eta_{rel}$ of 1.313 (as measured on a methylene chloride solution, c=5 g/l, at 25° C.). The glass temperature Tg (according to differential thermal analysis) was 221° C.

EXAMPLE 2

Polycarbonate of 1,1-bis-(4-hydroxyphenyl)-4-(1,1-dimethylpropyl)-cyclohexane

The procedure was as in Example 1 except that 338 g (1 mol) 1,1-bis-(4-hydroxyphenyl)-4-(1,1-dimethylpropyl)-cyclohexane was used instead of the bisphenol. The polycarbonate obtained had a relative viscosity of 1.334 (as measured on a methylene chloride solution, c=5 g/l, at 25° C.). The glass temperature Tg (according to differential thermal analysis) was 201° C.

EXAMPLE 3

Copolymer of bisphenol A and 1,1-bis-(4-hydroxyphenyl)-4-tert.-butyl-cyclohexane in a molar ratio of 1:1

The procedure was as in Example 1, except that half the bisphenol used was replaced by 114 g (0.5 mol) 2,2-bis-(4-hydroxyphenyl)-propane (bisphenol A).

The polycarbonate obtained had a relative viscosity $\eta_{rel}$ of (as measured in a methylene chloride solution at 25°, c=5 g/l. The glass temperature Tg (according to differential thermal analysis) was 192° C.

EXAMPLE 4

Polycarbonate of 1,1-bis-(4-hydroxyphenyl)-3-tert.-butyl-cyclohexane

The procedure was as in Example 1, except that the bisphenol used was replaced by 324 g (1 mol) 1,1-bis-(4-hydroxyphenyl)-3-tert.-butyl-cyclohexane. The polycarbonate obtained had a relative viscosity of 1,309 (as measured in a methylene chloride solution, c=5 g/l, at 25° C.). The glass temperature $T_g$ (according to differential thermal analysis) was 239° C.

EXAMPLE 5

Polycarbonate of 1,1-bis-(4-hydroxyphenyl)-3-(1,1-dimethylpropyl)-cyclohexane

The procedure was as in Example 1, except that the bisphenol used was replaced by 268 g (1 mol) 1,1-bis-(4-hydroxyphenyl)-3-(11-dimethylpropyl)-cyclohexane. The polycarbonate obtained had a relative viscosity of 1,314 (as measured in a methylene chloride solution, c=5 g/l, at 25° C.). The glass temperature $T_g$ (according to differential thermal analysis) was 220° C.

EXAMPLE 6

Example 1 was repeated but 10 Mol-% of diphenol was replaced by 3,3',5,5'-tetrabromo-bisphenol A. The resulting polycarbonate had an $\eta_{rel}$ of 1.302.

EXAMPLES 7–46

The results of burning tests of polycarbonates equipped with flame proofing agents are summarised in table 1. The flame-proofing agents were incorporated by means of a twin screw extruder ZSK of Werner and Pfleiderer.

Burning behavior was evaluated on the basis of the $O_2$-index according to ASTM 2863-70. For these tests specimen of $80\times6\times3$ mm were made by injection moulding.

TABLE 1

| Example | Polycarbonate of example | flame proofing agent | Amount, % | $O_2$-Index, % |
|---|---|---|---|---|
| 7 (Comparison) | 1 | — | — | 24,1 |
| 8 (Comparison) | 2 | — | — | 24,5 |
| 9 (Comparison) | 3 | — | — | 24,3 |
| 10 | 6 | — | — | 28,6 |
| 11 | 1 | K-p-toluenesulfonate | 0,2 | 28,2 |
| 12 | 2 | " | " | 28,8 |
| 13 | 3 | " | " | 28,5 |
| 14 | 6 | " | " | 33,4 |
| 15 | 1 | perfluoro-n-butane-K-sulfonate | " | 29,4 |
| 16 | 2 | $CF_3-CO_2-Ca-O_2C-CF_3$ | " | 28,9 |
| 17 | 1 | $C_6H_5-P(ONa)(ONa)$ | " | 29,5 |
| 18 | 1 | $Cl-C_6H_4-SO_2-C_6H_4-SO_3Na$ | " | 30,7 |
| 19 | 3 | " | " | 30,5 |
| 20 | 1 | decabromo diphenyl | 5 | 29,0 |
| 21 | 2 | " | 5 | 30,2 |
| 22 | 1 | decabromo + $Sb_2O_3$ | 5 + 2 | 31,8 |
| 23 | 1 | bis(tetrachlorophthalimido)ethane | 3 | 31,0 |
| 24 | 1 | $Na_3AlF_6$ | 0,2 | 29,7 |
| 25 | 3 | " | 0,2 | 30,4 |
| 26 | 3 | $Na_3AlF_6$ + polytetrafluoroethylene as example 27 | 0,2 + 0,1 | 33,3 |
| 27 | 3 | polytetrafluoroethylen, | 0,2 | 26,7 |
| 28 | 1 | Hostaflon 1740, Hoechst AG | 0,2 | 27,2 |
| 29 | 1 | $CH_3-N(K)-SO_2-C_6H_4-SO_2-N(K)-CH_3$ sulfur | 0,4 | 29,5 |
| 31 | 1 | red phosphorous average particle diameter 25 μm | 5 | 36,1 |
| 32 | 1 | Ferrocene, average particle diameter 28 μm | 0,1 | 27,2 |
| 33 | 1 | diphenylsulfone | 3 | 27,3 |
| 34 | 1 | Ni-Laurinate | 0,2 | 27,5 |
| 35 | 1 | Polyphenylenesulfide according to EP-A 171 021, melt viscosity 53 Pa.s at a shear rate of 100 Pa at 306° C. | 10 | 31,5 |
| 36 | 3 | " | 10 | 31,7 |
| 37 | 1 | NaCl | 0,3 | 27,6 |
| 38 | 1 | $K_2HPO_4$ | 0,2 | 28,5 |
| 38a | 1 | $Li_2SO_4$ | 0,2 | 27,9 |
| 39 | 1 | $NaNO_3$ | 0,2 | 30,3 |
| 40 | 1 | ZnS | 0,5 | 28,5 |
| 41 | 3 | ZnS | 0,5 | 28,6 |
| 42 | 1 | NaHS | 0,2 | 27,0 |
| 43 | 1 | $Na_3B_4O_7$ | 0,2 | 28,2 |
| 44 | 1 | Polydimethylsiloxane of viscosity 170 000 mPa.s | 7 | 28,7 |
| 45 | 1 | Polysiloxane block-co-polycarbonate of example | 50 | 28,9 |

TABLE 1-continued

| Example | Polycarbonate of example | flame proofing agent | Amount, % | O$_2$-Index, % |
| --- | --- | --- | --- | --- |
| 46 | 2 | 3 of DE-OS 3 334 782 K-salt of perfluoro-n-butane sulfonic acid + Polytetra-fluoro-ethylene (example 27) | 0,2 + 0,1 | 33,1 |

We claim:

1. A moulding composition comprising a thermoplastic aromatic polycarbonate resin having a weight average molecular weight of at least 10,000 comprising bifunctional carbonate structural units corresponding to

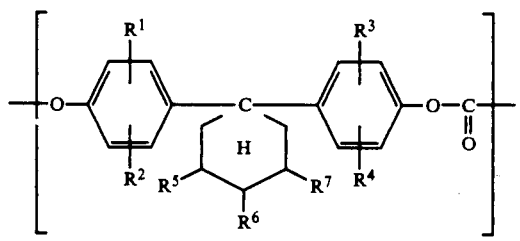

in which $R^1$, $R^2 R^3$ and $R^4$ independently of one another represent hydrogen, a $C_1$-$C_{12}$ hydrocarbon radical, halogen and $R^5$, $R^6$ and $R^7$ represent hydrogen, iso-$C_3$-$C_5$-alkyl, one of the substituents $R^5$, $R^6$ or $R^7$ being other than hydrogen, in quantities of from 100 to 1 mol-%, based on the total quantity of difunctional carbonate structural units in the polycarbonate 2. The composition of claim 1 wherein said difunctional carbonate structural units comprise units corresponding to

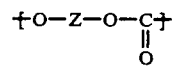

wherein Z is a $C_{6-30}$ aromatic radical.

3. The composition of claim 1 further comprising at least one member selected from the group consisting of a stabilizer, mold release agent, pigment, flameproof agent, antistatic agent, conductivity increasing agent, a filler and a reinforcing agent.

* * * * *